(12) United States Patent
Sato

(10) Patent No.: US 10,189,314 B2
(45) Date of Patent: Jan. 29, 2019

(54) PNEUMATIC TIRE

(71) Applicant: TOYO TIRE & RUBBER CO., LTD., Osaka-shi, Osaka (JP)

(72) Inventor: Yoshiki Sato, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 113 days.

(21) Appl. No.: 15/341,570

(22) Filed: Nov. 2, 2016

(65) Prior Publication Data

US 2017/0136827 A1    May 18, 2017

(30) Foreign Application Priority Data

Nov. 17, 2015  (JP) .................. 2015-225014

(51) Int. Cl.
*B60C 11/13*    (2006.01)
*B60C 11/03*    (2006.01)

(52) U.S. Cl.
CPC ...... *B60C 11/0309* (2013.01); *B60C 11/0302* (2013.01); *B60C 11/1392* (2013.01); *B60C 2011/0344* (2013.01); *B60C 2011/0358* (2013.01); *B60C 2011/133* (2013.01); *B60C 2011/1338* (2013.01)

(58) Field of Classification Search
CPC . B60C 11/13; B60C 11/1307; B60C 11/1315; B60C 2011/133; B60C 2011/1338; B60C 11/1376; B60C 11/1384; B60C 11/1392; B60C 11/04; B60C 11/042; B60C 11/045; B60C 11/11
USPC ....................... 162/209.18, 209.24
See application file for complete search history.

(56) References Cited

U.S. PATENT DOCUMENTS

| | | | | | |
|---|---|---|---|---|---|
| 4,177,850 | A | * | 12/1979 | Ogawa | ...... B60C 9/20 152/209.21 |
| 5,656,107 | A | * | 8/1997 | Laurent | ...... B29C 33/302 152/209.15 |
| 8,844,594 | B2 | * | 9/2014 | Ohashi | ...... B60C 11/0309 152/209.21 |
| 2008/0271827 | A1 | * | 11/2008 | Morrison | ...... B60C 11/01 152/209.25 |
| 2009/0095388 | A1 | * | 4/2009 | Cuny | ...... B60C 11/1384 152/154.2 |
| 2010/0206446 | A1 | | 8/2010 | Oizumi | |

(Continued)

FOREIGN PATENT DOCUMENTS

JP    58-22702    * 2/1983
JP    4-278809    * 10/1992

(Continued)

OTHER PUBLICATIONS

JP 2001-219714, English language machine translation. (Year: 2001).*

(Continued)

*Primary Examiner* — Eric Hug
(74) *Attorney, Agent, or Firm* — Westerman, Hattori, Daniels & Adrian, LLP

(57) ABSTRACT

A plurality of land portions is formed on a tread portion of a pneumatic tire by main grooves extending in a tire circumferential direction and lateral grooves extending in a tire width direction. At least one stepped portion which is lowered on a downstream side in a water drain direction is formed on at least a portion of a groove wall which forms the land portion.

5 Claims, 4 Drawing Sheets

(56) References Cited

U.S. PATENT DOCUMENTS

2011/0226398 A1\* 9/2011 Taniguchi ........... B60C 11/0309
152/209.21
2015/0336430 A1\* 11/2015 Sueyoshi ............ B60C 11/0316
152/209.24

FOREIGN PATENT DOCUMENTS

| JP | 2001-219714 | \* | 8/2001 |
| JP | 2005-231600 A | | 9/2005 |
| JP | 2010-188778 A | | 9/2010 |
| JP | 2013-82263 A | | 5/2013 |
| KR | 2001-0048462 A | | 6/2001 |

OTHER PUBLICATIONS

JP 4-278809, English language machine translation. (Year: 1992).\*
Office Action dated Apr. 3, 2018, issued in counterpart Chinese Application No. 201610945435.2, with English translation. (10 pages).

\* cited by examiner

PNEUMATIC TIRE

CROSS-REFERENCE TO RELATED APPLICATIONS

This application claims priority of Japanese Patent Application No.: 2015-225014 filed on Nov. 17, 2015, the content of which is incorporated herein by reference.

BACKGROUND OF THE INVENTION

Technical Field

The present invention relates to a pneumatic tire.

Related Art

Conventionally, there has been known a pneumatic tire where an arrow-shaped projection is formed on tapered surfaces of a longitudinal groove (see JP 2013-82263 A, for example).

There also has been known a pneumatic tire where a groove wall surface of a main groove on a tire equator side is formed such that an inclination angle of the groove wall surface with respect to a normal direction of a tire tread surface is changed along a tire circumferential direction (see JP 2010-188778 A, for example).

However, both pneumatic tires are less than optimal with respect to rigidity and drain property.

SUMMARY

It is an object of the present invention to provide a pneumatic tire which can enhance drain property of the pneumatic tire while maintaining rigidity of land portions.

An aspect of the present invention provides a pneumatic tire which includes a tread portion on which a plurality of land portions is formed by main grooves extending in a tire circumferential direction and lateral grooves extending in a tire width direction, wherein at least one stepped portion whose height is gradually decreased on a downstream side in a water drain direction is formed on at least one portion of a groove wall which forms the land portion.

With such a configuration, bubbles are generated when flowing water passes over the stepped portion and hence, the flow resistance can be reduced whereby drain property of the pneumatic tire can be enhanced. Further, the land portion per se is merely provided with the stepped portion and hence, there is no possibility the rigidity of the land portion is lowered.

The groove wall may preferably have a tapered surface which is gradually inclined toward a groove bottom side as the groove wall extends toward the inside of the groove from an open end of the groove, and the stepped portion may preferably be formed on the tapered surface.

With such a configuration, drain property of the pneumatic tire can be enhanced while rigidity of the land portion is enhanced.

The stepped portion may preferably be formed in a serrated shape.

With such a configuration, an amount of bubbles generated when drain water passes over the stepped portion can be increased and hence, drain property of the pneumatic tire can be further enhanced.

A width of the tapered surface may preferably be gradually decreased as the tapered surface extends in a water drain direction.

With such a configuration, it is possible to increase a ground contact area of the pneumatic tire while increasing rigidity of the land portions.

The tapered surface may preferably be formed on the groove wall which forms the lateral groove.

With such a configuration, the pneumatic tire can increase drain property by ensuring a sufficient water draining speed even in the lateral groove where a water draining speed comparable to a water draining speed in the main groove cannot be acquired.

The tapered surface may preferably be formed on the groove wall of the land portion on a stepping-in side.

With such a configuration, it is possible to prevent the increase of water pressure at a portion where the water pressure becomes largest when the pneumatic tire is brought into contact with a ground.

The stepped portion may preferably be formed with a height which is 0.3 mm or more from a surface of the land portion and falls within a range of 30% or less of a depth of the lateral groove.

With such a configuration, bubbles can be generated more easily.

According to the present invention, the stepped portion is formed on the groove wall which forms the land portion and hence, when drain water passes over the stepped portion, the flow resistance is decreased by generated bubbles whereby drain property of the pneumatic tire can be increased. Further, the land portion is merely provided with the stepped portion and hence, there is no possibility the rigidity of the land portion is lowered.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, embodiments of the present invention are described with reference to attached drawings. The description made hereinafter substantially merely exemplifies the present invention, and does not intend to limit the scope of the present invention, matters to which the present invention is applied and applications of the present invention. Further, drawings are schematically shown and hence, ratios of respective sizes and the like may differ from actual ratios of sizes and the like.

Figure 1:
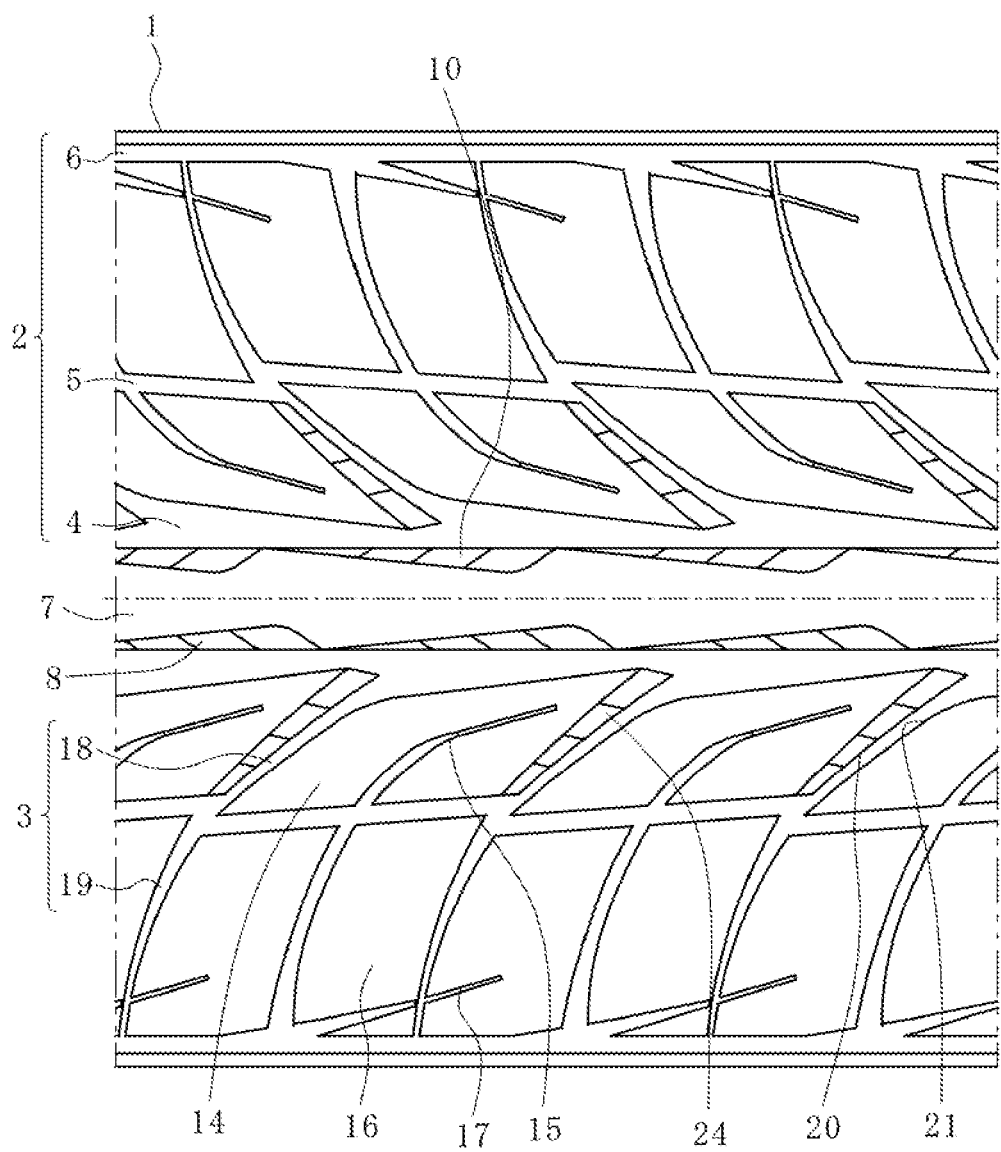
FIG. 1 is a partially-developed view of a tread portion of a pneumatic tire according to an embodiment of the present invention.

FIG. 1 is a developed view showing a tread portion 1 of a pneumatic tire according to this embodiment. Although not shown in the drawing, the pneumatic tire is configured such that a carcass extends between a pair of bead cores, the carcass is reinforced by a belt wound around an outer peripheral side of an intermediate portion of the carcass, and the tread portion 1 is disposed outside the carcass in a tire radial direction. On the tread portion 1, a plurality of main grooves 2 extending in a tire circumferential direction and a plurality of lateral grooves 3 extending in a tire width direction so as to intersect with the main grooves 2 are formed. Land portions (a rib 7 and blocks 14, 16) are formed on the tread portion by these main grooves 2 and the lateral grooves 3.

The main grooves 2 are formed of: a pair of first main grooves which is formed in a center portion of the tread portion 1 in the tire width direction; second main grooves 5 which extend in a zigzag manner on both sides of the pair of first main grooves 4; and third main grooves 6 which are positioned on both sides of the tread portion 1.

A width of the first main groove 4 is gradually increased as the first main groove 4 extends toward a kicking-out side in a tire circumferential direction, and the first main groove 4 is bifurcated for every one pitch, that is, for every one Me block 14 described later. One of the bifurcated grooves forms the first main groove 4 having a narrow width, and the other of the bifurcated grooves forms the first lateral groove 18 described later.

The rib 7 extending in, the tire circumferential direction is formed on a center portion of the tread portion 1 by the first main grooves 4. On upper portions of both side surfaces of the rib 7, a plurality of first tapered surfaces 8 is continuously formed in the tire circumferential direction. Each first tapered surface 8 is formed starting from a position one step lower than an upper surface of the rib 7 by way of a first vertical surface 9 (see FIG. 6 to FIG. 8). Further, each first tapered surface 8 is formed such that a width of the first tapered surface 8 is gradually increased in a direction from a tire stepping-in side to a tire kicking-out side and subsequently is gradually decreased. By forming the first tapered surfaces 8 on the rib 7, rigidity of the rib 7 can be enhanced. Further, by gradually decreasing a width of each first tapered surface 8, a ground contact area of the rib 7 can be ensured.

Figure 2:
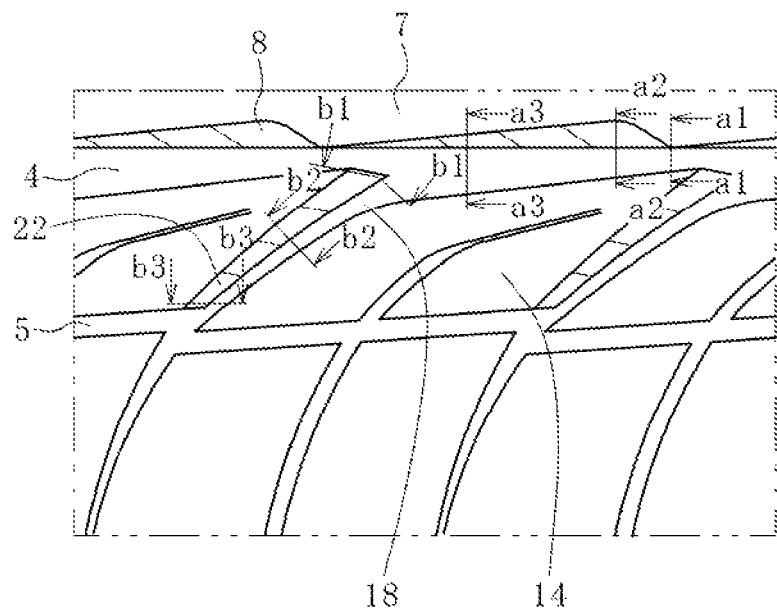
FIG. 2 is a partial enlarged view of the tread portion of the pneumatic tire shown in FIG. 1.
Figure 5:
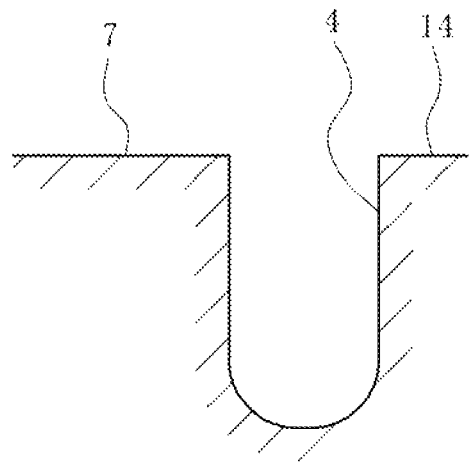
FIG. 5 is a cross-sectional view taken along a line a1-a1 in FIG. 2.
Figure 6:
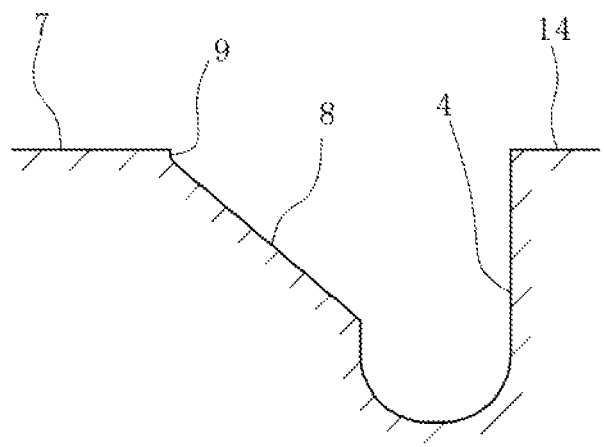
FIG. 6 is a cross-sectional view taken along a line a2-a2 in FIG. 2.
Figure 7:
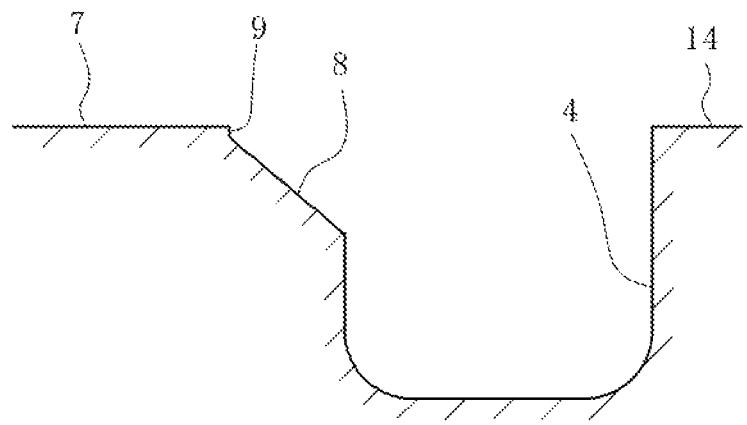
FIG. 7 is a cross-sectional view taken along a line a3-a3 in FIG. 2.

A boundary between the neighboring first tapered surfaces 8 is formed by only a side wall of the first main groove 4 having no first tapered surface 8 as shown in FIG. 5 which is a cross-sectional view taken along a line a1-a1 in FIG. 2. As shown in FIG. 6 which is a cross-sectional view taken along a line a2-a2 in FIG. 2, the width of the first tapered surface 8 becomes the largest at the position where the first tapered surface 8 is most inclined, wherein the position is disposed away from the boundary toward a kicking-out side. Subsequently, as shown in FIG. 7 which is a cross-sectional view taken along a line a3-a3 in FIG. 2, the width of the first tapered surface 8 is gradually decreased and a width of the first main groove 4 is gradually increased.

Figure 3:
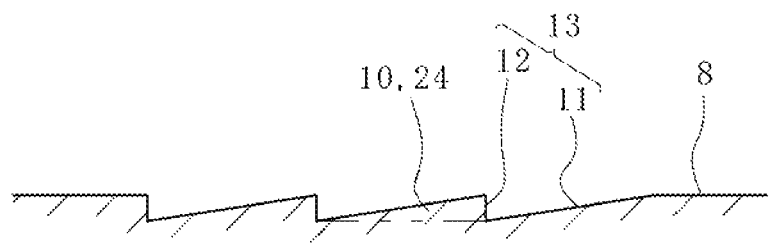
FIG. 3 is a cross-sectional view of a stepped portion shown in FIG. 2.

A first stepped portion 10 shown in FIG. 3 is formed on the first tapered surface 8. The first stepped portion 10 is a portion having a serrated shape in cross section and is formed by continuously forming a plurality of recessed portions 13 each of which is formed of an inclined surface 11 gradually deepened from a stepping-in side in the tire circumferential direction and a raised surface 12 raised from the deepest position of the inclined surface 11. In this embodiment, two first stepped portions 10 are formed by three recessed portions 13. When water passes over the first tapered surface 8, the first stepped portion 10 generates bubbles in water so that an air layer is formed between water and the first tapered surface 8 whereby flow resistance is lowered. Particularly, a distal end portion of the first stepped portion 10 is formed at an acute angle and hence, an amount of bubbles is further increased so that flow resistance is largely lowered whereby a flow speed of water can be sufficiently increased.

The first tapered surface 8 on which the first stepped portion 10 is formed has a width of 0.3 mm or more from the upper surface of the rib 7. This width is set to a value which falls within a range of 30% or less of a groove depth of the main groove 2. A projecting portion of each first stepped portion 10 is formed at an acute angle so that the first stepped portion 10 can easily generate bubbles in water which passes over the first tapered surface 8. Further, each first stepped portion 10 is formed such that the first stepped portion 10 starts from the position one step lower than the upper surface of the rib 7. Accordingly, the serrated cross section of the first stepped portion 10 is not directly exposed to the upper surface of the rib 7 and hence, the first stepped portion 10 is minimally damaged until the wear of a tread surface progresses to some extent due to traveling of a vehicle.

The second main groove 5 is formed into a zigzag shape where the second main groove 5 is gradually inclined outward in the tire width direction as the second main groove 5 extends toward, a kicking-out side from a stepping-in side in the tire circumferential direction, and is bent inward in the tire width direction at a point where the first lateral groove 18 described later merges with the second main groove 5. Each of Mediate blocks (Me blocks 14) is formed by the first main groove 4, the second main groove 5 and the first lateral grooves 18. A first narrow groove 15 is formed on the Me block 14. The first narrow groove 15 extends toward a stepping-in side in the tire circumferential direction while extending inward in the tire width direction from a center portion of a side surface on a second main groove side. A width of the first narrow groove 15 is gradually decreased as the first narrow groove 15 extends toward a distal end thereof from the second main groove side thereof.

The third main grooves 6 extend straight on both sides of the tread portion 1 respectively. Shoulder blocks (Sh blocks 16) are formed by the second main groove 5, the third main groove 6 and second lateral grooves 19 described later. A second narrow groove 17 is formed on the Sh block 16. The second narrow groove 17 extends toward a stepping-in side in the tire circumferential direction while extending inward in the tire width direction from a point where the third main groove 6 and the second lateral groove 19 merge with, each other. A width of the second narrow groove 17 is gradually decreased as the second narrow groove 17 extends toward a distal end thereof from the third main groove 6, and a distal end portion of the second narrow groove 17 reaches the neighboring Sh block 16.

The lateral groove 3 is formed of the first lateral groove 18 which makes the first main groove 4 and the second main groove 5 communicate with each other, and the second lateral groove 19 which makes the second main groove 5 and the third main groove 6 communicate with each other.

The first lateral groove 18 is branched from the first main groove 4 at a position where the first main groove 4 has a largest width and extends toward the second lateral groove 19. The first lateral groove 18 has a first arcuate surface 20 which is disposed on a stepping-in side of the Me block 14, and a second arcuate surface 21 which is disposed on a kicking-out side and extends from a side surface of the first lateral groove 18 which defines the first main groove 4. A width of the first lateral groove 18 is gradually decreased as the first lateral groove 18 extends toward the second main groove 5 from the first main groove 4. A second tapered surface 22 which extends toward the second main groove 5 from the first main groove 4 is formed on the first arcuate surface 20. The second tapered surface 22 is formed starting from the position one step lower than an upper surface of the Me block 14 by way of a second vertical surface 23 (see FIG. 8 to FIG. 10). A width of the second tapered surface 22 is gradually decreased as the second tapered surface 22 extends toward the second main groove 5 from the first main groove 4. By forming the second tapered surface 22, rigidity of the Me block 14 can be enhanced. Further, by gradually decreasing the width of the second tapered surface 22, it is possible to prevent a ground contact area of the Me block 14 from becoming excessively small.

Figure 8:
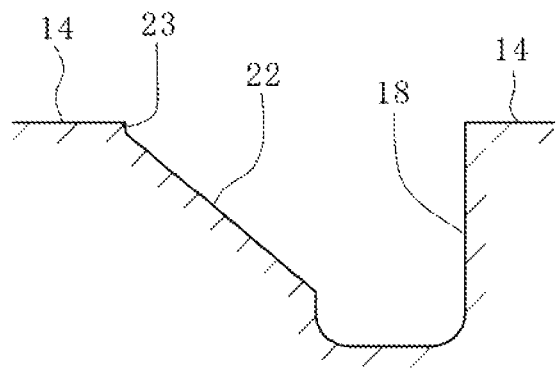
FIG. 8 is a cross-sectional view taken along a line b1-b1 in FIG. 2.
Figure 9:
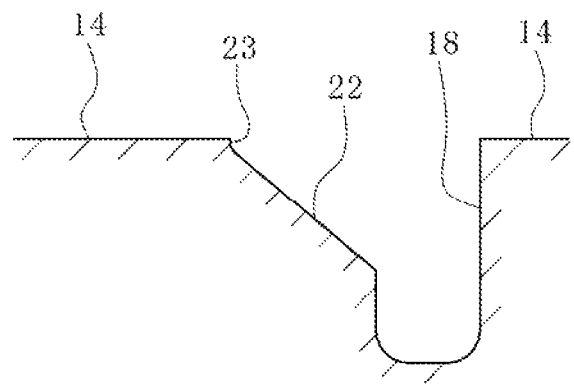
FIG. 9 is a cross-sectional view taken along a line b2-b2 in FIG. 2.
Figure 10:
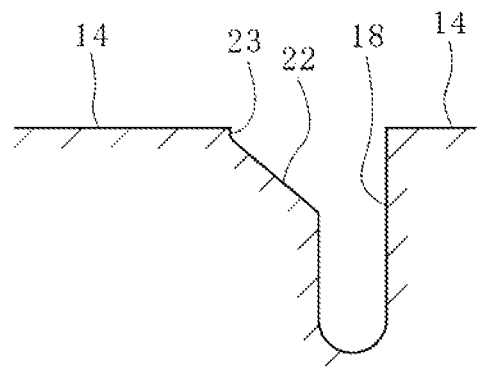
FIG. 10 is a cross-sectional view taken along a line b3-b3 in FIG. 2.

As shown in FIG. 8 which is a cross-sectional view taken along a line b1-b1 in FIG. 2, at an entrance of the first lateral groove 18, that is, at a portion of the first lateral groove 18 connected with the first main groove 4, the first lateral groove 18 has the largest width, and the second tapered surface 22 also has the largest width. A groove bottom of the first lateral groove 18 is formed of a flat surface. As shown in FIG. 9 which is a cross-sectional view taken along a line b2-b2 in FIG. 2, at an intermediate position of the first lateral groove 18, both a width of the first lateral groove 18 and a width of the second tapered surface 22 are decreased. As shown in FIG. 10 which is a cross-sectional view taken along a line b3-b3 in FIG. 2, at an exit of the first lateral groove 18, that is, at a portion of the first lateral groove 18 connected with the second main groove 5, the width of the first lateral groove 18 becomes the smallest, and the width of the second tapered surface 22 also becomes the smallest. The groove bottom of the first lateral groove 18 has an arcuate shape in cross section.

A second stepped portion 24 is formed on the second tapered surface 22. A cross-sectional shape of the second stepped portion 24 is substantially equal to that of the first stepped portion 10 shown in FIG. 3, and advantageous effects obtained by such a shape are also equal to the advantageous effects obtained by the shape of the first stepped portion 10. By forming the second stepped portion 24 on the first lateral groove 18, the flow of water in the first lateral groove 18 through which water is hard to flow compared to the first main groove 4 can be made smooth and hence, a draining speed can be enhanced whereby drain property can be further enhanced. Particularly, the second stepped portion 24 is formed on a stepping-in side of the Me block 14 where a water pressure in the first lateral groove 18 disposed on the side of the second stepped portion 24 is increased when the pneumatic tire is brought into contact with a ground. Accordingly, the second stepped portion 24 also has a function of alleviating the increase of a water pressure in the first lateral groove 18.

The second lateral groove 19 extends toward the side in the tire width direction from a point where the second main groove 5 and the first lateral groove 18 merge with each other, and a point where the second main groove 5 and the first narrow groove 15 merge with each other. Accordingly, water can be smoothly drained without obstructing the flow of water from the second main grooves 5, the first lateral grooves 18, and the first narrow grooves 15.

In the pneumatic tire provided with the tread portion 1 having the above-mentioned configuration, when a vehicle travels on a road surface wet with rain or the like, the pneumatic tire can acquire the following advantageous effects.

That is, in a center region of a ground contact surface, water is drained in the first main grooves 4 on both sides of the rib 7 toward a kicking-out side in the tire circumferential direction. Rigidity of the rib 7 is enhanced by forming the first tapered surfaces 8 on upper half portions on both sides of the rib 7. Accordingly, there is no possibility that the rib 7 is deflected toward a first main groove side thus allowing the first main groove 4 to ensure a sufficient flow space. Further, a width of each first tapered surface 8 is gradually decreased toward a kicking-out side in the tire circumferential direction. Accordingly, the decrease of the ground contact area of the rib 7 can be suppressed thus allowing the pneumatic tire to possess a proper traveling performance. Further, the first stepped portion 10 is formed on the first tapered surface 8. With such a configuration, bubbles are generated in water which passes over the first tapered surface 8 so that an air layer is formed between water and the first tapered surface 8 whereby a draining speed is increased and drain property can be enhanced.

In a mediate region of the ground contact surface, insufficiency of drainage when the drainage is performed only by the first main grooves 4 can be compensated by the first lateral grooves 18. In the first lateral groove 18, the second tapered surface 22 is formed on the first arcuate surface 20 on a stepping-in side of the Me block 14 so that an opening width on a first main groove side is widened and, at the same time, rigidity of the Me block 14 is enhanced. The second stepped portion 24 is formed on the second tapered surface 22 and hence, drain property is enhanced. Accordingly, water drained from the first main groove 4 can be smoothly guided to the first lateral groove 18.

The present invention is not limited to the configuration described in the above-mentioned embodiment, and various modifications are conceivable.

Figure 4:
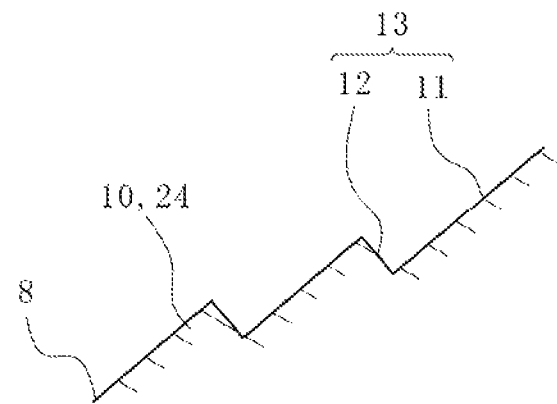
FIG. 4 is a view showing a modification of the stepped portion shown in FIG. 3.

In the above-mentioned embodiment, the projecting portions of the stepped portion 10, 24 are formed so as to project at an acute angle in cross section. However, as shown in FIG. 4, the projecting portions of the stepped portion 10, 24 may be formed so as to project at a right angle in cross section.

In the above-mentioned embodiment, the stepped portion 10 is formed on the tapered surfaces 8 which are formed on the upper half portions of both side surfaces of the rib 7 and the stepped portion 24 is formed on the tapered surfaces 22 which are formed on the upper half portions of both side surfaces of the block 14, 16 respectively. However, a stepped portion may be formed on lower half portions of both side surfaces of the rib 7. Alternatively, only the stepped portion 10, 24 may be formed on the rib 7 or the block 14, 16 without forming the tapered surface 8, 22.

In the above-mentioned embodiment, the stepped portions 10 are formed on both side surfaces of the rib 7 and the stepped portions 24 are formed on the stepping-in side surface of the Me block 14. However, provided that water flows through the groove, the stepped portions 10, 24 may be formed at any positions of the groove.

What is claimed is:

1. A pneumatic tire, comprising a tread portion on which land portions are formed by main grooves extending in a tire circumferential direction and lateral grooves extending in a tire width direction, wherein at least one stepped portion whose height is gradually decreased on a downstream side in a water drain direction is formed on at least one portion of a groove wall which forms the land portion;

wherein the groove wall has a tapered surface which is gradually inclined toward a groove bottom side as the groove wall extends toward the inside of the groove from an open end of the groove, wherein the stepped portion is formed on the tapered surface; and wherein the tapered surface is formed on the groove wall which forms the lateral groove.

2. The pneumatic tire according to claim 1, wherein the stepped portion is formed in a serrated shape.

3. The pneumatic tire according to claim 1, wherein a width of the tapered surface is gradually decreased as the tapered surface extends in a water drain direction.

4. A pneumatic tire, comprising a tread portion on which land portions are formed by main grooves extending in a tire circumferential direction and lateral grooves extending in a tire width direction, wherein at least one stepped portion whose height is gradually decreased on a downstream side in a water drain direction is formed on at least one portion of a groove wall of at least one of the lateral grooves which forms the land portion as a block;

wherein the groove wall has a tapered surface which is gradually inclined toward a groove bottom side as the groove wall extends toward the inside of the groove from an open end of the groove, wherein the stepped portion is formed on the tapered surface; and wherein the tapered surface is formed on the groove wall of the land portion on a stepping-in side.

5. The pneumatic tire according to claim 4, wherein the stepped portion is formed with a height which is 0.3 mm or more from a surface of the block and falls within a range of 30% or less of a groove depth.

* * * * *